United States Patent Office 3,424,892
Patented Jan. 28, 1969

3,424,892
PROCESS OF ELECTRIC ARC WELDING
Wayne L. Wilcox, Havertown, Pa., assignor to Arcos Corporation, Philadelphia, Pa., a corporation of Pennsylvania
No Drawing. Continuation-in-part of application Ser. No. 394,616, Sept. 4, 1964. This application Dec. 18, 1967, Ser. No. 691,146
U.S. Cl. 719—137      11 Claims
Int. Cl. B23k 35/34, 9/00

ABSTRACT OF THE DISCLOSURE

The present invention relates to a process for making tough welds of steel at an as-welded yield strength in excess of 115,000 p.s.i. and to a flux-cored electrode for use therein, the invention being made possible by a particular composition of the flux core, a particular composition of the composite electrode, and by certain welding techniques including preheating the steel work, protecting the flux and electrode against moisture and welding under specified conditions. A preferred procedure produces tough welds of steel having a yield strength as welded in excess of 130,000 p.s.i.

Description of invention

The present application is a continuation-in-part containing claims divisible from my copending application Ser. No. 394,616, filed Sept. 4, 1964 for Process of Electric Arc Welding.

The present invention relates to processes of producing steel welds which combine unusual toughness with high yield strengths, and to electrodes and fluxes therefor.

A purpose of the invention is to obtain a greater margin of safety against brittle failure and a greater toughness and higher yield strength in welds of low alloy steel.

A further purpose is to produce tough steel weld metal having a yield strength in excess of 115,000 p.s.i., preferably in excess of 130,000 p.s.i., and in many instances in excess of 140,000 p.s.i.

A further purpose is to minimize weld cracking in welding steel of high strength.

A further purpose is to minimize the formation of cracks in the heat affected zone in welding steel of high strength.

A further purpose is to employ high purity electrode wire in welding high strength steel. The term electrode wire is used herein to define the metallic electrode or metallic portion of the electrode, which may for example be a wire of any cross section, for example a tubular wire, or a rolled up sheet, or a strip of rectangular cross section.

A further purpose is to employ a high purity flux in welding high strength steel. The flux is used with the electrode wire, with the purpose of stabilizing the electric arc to permit welding under the protection of shielding gases free from oxygen and hydrogen. After passing through the arc the flux freezes to form a protective slag over the weld bead. The flux itself or other neutral fluxes may also be employed to shield the weld without additional gaseous shielding.

A further purpose is to apply the principles of the invention to welding with flux-cored electrodes, preferably continuous electrodes, using consumable electric arc welding techniques such as gas-shielded welding with a flux core in the electrode, or short circuiting or pulsed arc welding techniques using flux and a shielding gas, or flux-shielded welding. Shielding gas may be used such as carbon dioxide, argon, helium or mixtures thereof except that no oxygen or hydrogen may be added to the gas. It will be understood that where deoxidation conditions are adequate under the particular flux and with a particular electrode wire, the welding may be accomplished in air.

A further purpose is to apply the principles of the invention to downhand welding, vertical welding, and overhead welding as required.

Further purposes appear in the specification and in the claims.

In the prior art existing electrodes and welding techniques make it possible to produce tough welds in low alloy steels at yield strengths as high as 110,000 p.s.i. When welding at higher strength levels, however, it has proved to be very difficult to secure the required high yield strengths along witth adequate toughness particularly as measured by Charpy V-notch impact resistance at low temperatures such as −60° F.

One of the important advantages of the present invention is that unusual toughness can be obtained along with as-welded yield strengths in low alloy steels as high as 115,000 p.s.i., in many cases above 130,000 p.s.i. and in some cases as high as 140,000 p.s.i., or even higher. These high strengths have been secured along with Charpy V-notch impact resistance in excess of 25 foot-pounds at −60° F. and in excess of 30 foot-pounds at room temperature.

This combination of properties makes the process of the invention unusually valuable for high strength welding, for example in connection with submarine hull construction.

These properties are obtained in welding low alloy weldable steel which itself has comparable properties.

The flux applied as a core in a metallic electrode sheath, is a combination of fluoride, magnesia, and arc stabilizer of the type of zircon or titania, with a source of silicon, a source of manganese, and optionally ferrochrome, ferromanganese and nickel.

Both the flux and the electrode wire should be low in moisture content. For this purpose the flux is normally baked at the factory at a temperature of 200 to 1000° F., preferably in the range between 600 and 800° F. As an additional step, the electrode wire and flux may to advantage be baked shortly before use at a temperature of 200 to 1000° F. and protected from moisture subsequent to baking, as for example by carrying it at the elevated temperature to the welding installation. In some cases the electrode and flux will, after baking as previously mentioned, to advantage be held in an oven to protect it from moisture, suitably maintaining it at a temperature of 150 to 300° F. Optionally the flux and the electrode wire may be shipped in a dehumidifying container, for example containing silica gel, to the point of use.

The work is pre-heated to a temperature of 100 to 400° F., preferably 200 to 300° F., prior to welding. Then the welding is conducted under a protecting layer of slag produced by melting the flux. Finally the weld deposited metal and the work are very desirably postheated at a temperature of 150 to 600° F., and preferably 200 to 300° F., for a time of at least three hours to eliminate any hydrogen which may have been picked up during the welding. Very desirably when a temperature in the lower range, as for example 150 to 300° F., is used, the time for elimination of hydrogen should be at least six hours.

By this technique, which will be described in more detail, very much higher margins of safety against brittle failure are obtained in welds which are tougher and of higher yield strengths and sound welds free from cracks are more reliably obtained. Yield strengths of 115,000 p.s.i. can be reliably obtained, and in many cases the yield strengths are as high as 130,000 p.s.i. or even as high as 140,000 p.s.i. or even higher, and in any case combined with exceptionally good toughness. The welds are exceptionally free from cracking in the weld deposited metal as well as in the heat affected zone.

BASE METAL

The work is low alloy weldable steels which may be in plate, sheet or any other suitable form. While compositions of other types may be used as later explained, in many cases the composition of the work by weight will be as follows:

| | Percent |
|---|---|
| Carbon | 0.05–0.50 |
| Sulphur (maximum) | 0.01 |
| Phophorus (maximum) | 0.01 |
| Silicon (maximum) | 0.5 |
| Manganese | 0.05–1.5 |
| Nickel | 0.5–6 |
| Chromium | 0–2 |
| Molybdenum | 0–1 |
| Columbium | 0–0.5 |
| Vanadium | 0–0.1 |
| Copper | 0–0.5 |
| Iron | Balance |

The following is the composition of a typical heat of one commercial steel of this kind which is known as HP–150 and is sold by Republic Steel Company:

| | Percent |
|---|---|
| Carbon | 0.22 |
| Sulphur | 0.008 |
| Phosphorus | 0.008 |
| Silicon | 0.055 |
| Manganese | 0.12 |
| Nickel | 3.05 |
| Chromium | 1.39 |
| Molybdenum | 0.89 |
| Vanadium | 0.004 |
| Boron | 0.0 |
| Copper | 0.09 |
| Columbium | 0.08 |
| Aluminum | 0.019 |
| Titanium | 0.007 |
| Iron | Balance |

The properties of this steel are typically as follows:

| | | |
|---|---|---|
| Yield strength | p.s.i. | 150,000 |
| Tensile strength | p.s.i. | 162,000 |
| Elongation in 2" | percent | 19 |
| Reduction in area | do | 69 |
| The Charpy V-notch impact resistance at 0° F. | ft.-lbs | 94 |
| The Charpy V-notch impact resistance at −120° F. | ft.-lbs | 94 |

Another typical steel of the character in discussion which can be welded according to the invention is known commrecially as T-steel and has the following typical analysis in percentage by weight:

| | Percent |
|---|---|
| Carbon | 0.13 |
| Sulphur | 0.025 |
| Phosphorus | 0.021 |
| Silicon | 0.19 |
| Manganese | 0.89 |
| Nickel | 0.82 |
| Chromium | 0.52 |
| Molybdenum | 0.44 |
| Vanadium | 0.034 |
| Boron | 0.003 |
| Copper | 0.25 |
| Iron | Balance |

The heat of T-steel referred to above was quenched and tempered to obtain the following properties:

| | | |
|---|---|---|
| Yield strength | p.s.i. | 138,000 |
| Tensile strength | p.s.i. | 147,750 |
| Elongation in 2 inches | percent | 14 |
| Reduction of area | do | 42 |

Another typical low alloy weldable steel which may function as base metal is U.S. Steel Corporation HY–150 which has a nominal composition approximately as follows:

| | Percent |
|---|---|
| Carbon | 0.09 |
| Sulphur | 0.006 |
| Phosphorus | 0.006 |
| Silicon | 0.25 |
| Manganese | 0.75 |
| Nickel | 5.0 |
| Chromium | 0.55 |
| Molybdenum | 0.50 |
| Vanadium | .07 |
| Copper | Residual |

Iron, Balance of metallic ingredients.

The properties are not substantially different from those given above for HP–150.

In many cases the base metal may be a chromium-molybdenum steel of a composition corresponding to the AISI 4100 or AISI 4300 series.

Flux

The flux employed according to the present invention has the following composition by weight:

| | |
|---|---|
| A source of fluoride such as cryolite, potassium zirconium fluoride, or fluorspar or a mixture of the same | 5 to 25% and preferably 21%. |
| Magnesia | 5 to 15% and preferably 8%. |
| An arc stabilizer of the class consisting of zircon (zirconium silicate) and titania | 5 to 45% and preferably 20%. |
| Silica | 0 to 25% and preferably 8%. |
| A source of silicon such as zirconium silicon (35% to 40% zirconium and 47 to 52% silicon) or ferrosilicon | 5 to 10% and preferably 7%. |
| A source of manganese such as electrolytic manganese or ferromanganese | 2 to 15% and preferably 5%. |
| Ferrochrome | 0 to 5% and preferably 3%. |
| Ferromolybdenum | 0 to 5% and preferably 3%. |
| Nickel | 0 to 20% and preferably 15%. |
| Magnesium aluminum (50% of each) deoxidizer | 0 to 15% and preferably 13%. |

The flux will suitably be included as a core within a metallic sheet electrode, made for example by crimping a metallic strip to form a surrounding sheath about the core. The core will ordinarily make up to 20 to 35% and preferably about 25% of the weight of the combined core and sheath.

It should be kept in mind that if carbon is being added with the ferromanganese allowance should be made for this in selecting the carbon content for the electrode wire.

It should be kept in mind that it is important that harmful ingredients such as sulphur, phosphorus and copper should not be introduced as impurities in the fluxing ingredients. A limit of 0.1% (preferably 0.05%) of phosphorus and a similar limit on sulphur is maintained in the non-metallic ingredients, and in the various alloying ingredients and ferro alloys. The phosphorus limit in high carbon ferromanganese however has frequently been 0.3%; hence we have found it desirable to use electrolytic manganese in many of our experiments.

It should be kept in mind also that the quantity of ferrochrome, ferromolybdenum, ferrocolumbium and ferrovanadium and nickel included in the flux will be adjusted with respect to the quantities in the electrode wire, so as to obtain the desired final quantity in the weld deposited metal.

Since the flux is present as a core it need not have a binder. However, a binder may optionally be used. A preferred binder is an alkali metal silicate in the range of 5 to 20% of the total weight of the flux. A preferred composition employs three-quarters of the alkali metal silicate as potassium silicate and one-quarter as sodium silicate. The preferred potassium silicate is a concentration of 40.5° Baumé with a ratio of potassium oxide to silica of 1:2.1. The preferred sodium silicate is a concentration of 47° Baumé with a ratio of soda to silica of 1:2.9. The potassium silicate tends to impart arc stability and if potassium silicate is not employed, some other arc stabilizer such as potassium titanate should be used.

The flux and the electrode wire should both be baked initially at a temperature of 200 to 1000° F. and preferably 600 to 800° F. to drive off moisture at the time of manufacture.

It is also important as later explained to protect against picking up moisture after this initial baking.

It will be evident that any fluoride can be used as a source of fluoride providing it does not introduce an objectionable element into the weld.

It will be evident that any silicon alloy may be used as a source of silicon providing that it does not introduce an objectionable element into the weld.

It will be evident that the flux may also be used as an arc-submerging flux for welds made without gas shielding.

Electrode

The electrode strip employed in the present invention is of high purity, particularly in respect to low contents of sulphur, phosphorus, oxygen, hydrogen, and nitrogen. The electrode strip employed in the present invention has a composition by weight as follows:

| | |
|---|---|
| Carbon | 0.05–0.20%. |
| Sulphur | 0.01% maximum. |
| Phosphorus | 0.01% maximum. |
| Silicon | 0.3% maximum preferably 0.1% maximum. |
| Manganese | 0.05–1.5%. |
| Nickel | 0–5%, preferably 1.5–5% and most desirably 2.0–3.5%. |
| Chromium | 0–2%. |
| Molybdenum | 0–1%. |
| Vanadium | 0–0.1%. |
| Columbium | 0–0.5%. |
| Copper | 0.5% maximum. |
| Oxygen | 100 p.p.m. and preferably 20 p.p.m. maximum. |
| Hydrogen | 10 p.p.m. and preferably 2 p.p.m. maximum. |
| Nitrogen | 100 p.p.m. and preferably 50 p.p.m. maximum. |

It will be understood that if the nickel is being put in by the flux then the nickel need not be in the electrode strip. Similarly manganese, chromium, molybdenum, columbium and vanadium could be put in by the flux or by the electrode strip. Nickel, however, in the range between 1.5 and 5% in the weld metal is essential and manganese in the range between 1.0 and 2.3% in the weld metal is essential. Also chromium in the range between 0.5 and 1.5% in the weld metal is very important. The molybdenum content in the weld metal should be in the range between 0.3 and 0.6%, which it will be understood can be obtained from the flux or from the electrode strip. Columbium and vanadium in the weld metal are optional.

The diameter of the electrode will vary according to the welding process and most often will be in a range between 1/16 inch and 3/16 inch.

Welding technique

It is important that the weld members be pre-heated to a temperature of between 100 and 400° F. and held at this temperature during welding. This has the effect of eliminating moisture in connection with the weld members and also reducing the likelihood of cracking in the weld.

To eliminate moisture, the combination of flux and electrode should be heated to a temperature of 200 to 1000° F. prior to welding. The need for such baking will depend on the openness of the electrode cross section and the exposure to moisture. The flux combined with the electrode may be retained in a heating oven up to the time of welding and then taken immediately to the point of welding. A variation which is preferable in some cases is to remove the combined flux and electrode from the high temperature oven and place it in an oven maintained at a lower temperature, suitably in the range from 100 to 400° F., to avoid moisture absorption, taking it directly from this later oven to the point of welding. A still further variation is to hold the flux combined with the electrode in a dehumidified space, maintaining a dehumidifying condition suitably by an absorbent such as activated alumina or silica gel.

Welding may be carried out with a consumable metal arc welding technique applicable to flux-cored electrodes, preferably continuous electrodes. The welding will be carried on in an atmosphere of carbon dioxide, argon, helium or a mixture thereof, or some other suitable protecting gas.

Where a protecting gas is used it can be introduced to a hood or chamber in which the welding is carried on or it can be applied directly to the point of welding by a cylindrical nozzle or gas lens with outlet orifice slightly larger than the area to be shielded.

Also, the short-circuiting and pulsed arc welding techniques can be used applying flux and a protecting gas of the character just mentioned.

Also, welding can be performed by submerged arc technique using the same flux or a high purity neutral flux such as those described in U.S. Patent 3,340,103 dated Apr. 5, 1967.

The welding can be carried on continuously or intermittently. The welding can be downhand in all cases, or it can be vertical or overhead when gas shielded.

The invention can be applied with alternating current or direct current, either polarity, although a pefrerred type would be direct current revese polarity.

Welded joints prepared in accordance with my invention will have yield strength in excess of 115,000 p.s.i., in many cases in excess of 130,000 p.s.i. and in some cases in excess of 140,000 p.s.i. or even higher, and the Charpy V-notch impact resistance in excess of 2 foot-pounds at −60° F. and in excess of 30 foot-pounds at room temperature.

The weld deposit has the following analysis by weight:

| | |
|---|---|
| Carbon | 0.05 to 0.15%. |
| Sulphur | 0.01% maximum. |
| Phosphorus | 0.01% maximum. |
| Silicon | 0.6% maximum. |
| Manganese | 1.0 to 2.3%. |
| Nickel | 1.5 to 5% and preferably 2.0 to 3.5%. |
| Chromium | 0.5 to 1.5%. |
| Molybdenum | 0.3% to 0.6%. |
| Vanadium | 0 to 0.1%. |
| Columbium | 0 to 0.5%. |
| Copper | 0 to 0.5%. |
| Oxygen | 400 p.p.m. maximum. |
| Hydrogen | 50 p.p.m. maximum. |
| Nitrogen | 300 p.p.m. maximum. |
| Iron | Balance. |

After welding it is very important in the process of the invention to allow hydrogen to be removed by diffusion. This is carried out by post-heating the weld in a suitable oven or in air at a temperature of 150 to 600° F. and preferably at a temperature of 200 to 300° F. If the temperature is in the higher range the recommended time of post-heating is at least three hours and if the temperature is 300° F. or below, it is preferable to heat for at least six hours.

Joints are made in 1 inch plates according to the invention and tested according to FIGURE 3 of Government Specification MIL–22200/1B, substituting the flux-cored wire of the invention for the covered electrode of that specification, and using a shielding gas as described below.

EXAMPLE 1

A flux made up as follows is used:

| | Percent |
|---|---|
| Cryolite | 11 |
| Potassium zirconium fluoride | 10 |
| Magnesia | 8 |
| Zircon | 20 |
| Silica | 8 |
| Zirconium-silicon (47–52% silicon, 35–40% zirconium) | 7 |
| Electrolytic manganese | 5 |
| Ferrochrome | 3 |
| Nickel | 13 |
| Magnesium-aluminum (50% magnesium, 50% aluminum) | 15 |
| Total | 100 |

A metallic strip having the following composition is employed as the electrode wire:

| | Percent |
|---|---|
| Carbon | 0.05 |
| Suhphur | 0.007 |
| Phosphorus | 0.005 |
| Silicon | 0.01 |
| Manganese | 0.08 |
| Nickel | 2.72 |
| Chromium | 0.01 |
| Molybdenum | 0.01 |
| Copper | 0.06 |
| Iron | Balance |

The metallic strip is formed into a flux-cored wire with the above-mentioned flux, 25% of the weight of the combination of flux and metallic sheath consisting of flux. The wire sheath is formed around the flux to make a ⅛ inch electrode. No binder is used in the flux.

The flux-cored wire is baked as above set forth. Welding is carried on under direct current reverse polarity at a current between 275 and 500 amperes and a voltage between 25 and 35 volts. Air is excluded from the weld by carbon dioxide gas free from moisture and flowing at a rate of 40 cubic feet per hour. The speed of progression of the welding head or torch is in the range of 6 to 24 inches per minute.

The weld deposited metal, omitting gaseous components, has the following composition by weight:

| | Percent |
|---|---|
| Carbon | 0.08 |
| Sulphur | 0.01 |
| Phosphorus | 0.01 |
| Silicon | 0.5 |
| Manganese | 1.4 |
| Nickel | 2.5 |
| Chromium | 0.8 |
| Molybdenum | 0.5 |
| Iron, Balance of metallic composition. | |

The properties of the weld deposited metal as welded in welding HP–150 steel are at least as good as the following:

| | | |
|---|---|---|
| Yield strength | p.s.i | 130,000 |
| Tensile strength | p.s.i | 135,000 |
| Elongation in 2 inches | percent | 16 |
| Reduction of area | do | 50 |
| Charpy V-notch impact resistance at −60° F. | foot-pounds | 20 |
| Charpy V-notch impact resistance at room temperature | foot-pounds | 30 |

EXAMPLE 2

The flux-cored wire of Example 1 (same flux and same strip) is used to prepare similar test plates by welding in a shield of argon gas. Whereas stable welding conditions with ordinary electrodes might require the addition of 1% or 2% of oxygen by volume to the argon, which would be seriously detrimental to the weld properties, the arc with the flux-cored wire of the invention is stable in the presence of 100% argon.

The weld properties obtained are at least as good as those set forth below:

| | | |
|---|---|---|
| Yield strength | p.s.i | 130,000 |
| Tensile strength | p.s.i | 135,000 |
| Elongation in 2 inches | percent | 16 |
| Reduction in area | do | 50 |
| Charpy V-notch impact resistance at −60° F. | foot-pounds | 20 |
| Charpy V-notch impact resistance at room temperature | foot-pounds | 30 |

EXAMPLE 3

The same wire and technique are used as in Example 2 except that the shielding gas is 75% argon and 25% of helium by volume. The results are similar to those obtained in Example 2.

EXAMPLE 4

The same wire is used as in Example 1 with the flux of Example 1 for the flux core and also for the protective flux deposited on the weld, under submerged arc welding tetchnique. The results are at least as good as those set forth in Example 1.

The following is a suitable welding procedure to demonstrate the adequacy or suitability of the process and so to secure approval of the procedure by qualifying bodies such as the ASME Boiler Code or the American Bureau of Shipping or Llyod's Register, etc.

Use test plates of HP–150 steel, 1 inch in thickness, the test plates being 8½ inches by 12 inches, bolted to a welding bench for higher restraint. The temperature of pre-heat is 200° F. and the interpass temperature is 225 to 250° F. The joint is aged overnight at the interpass temperature or a higher temperature after welding is completed and before the joint is cooled below the pre-heat temperature. The joint is prepared for welding in accordance with FIGURE 3 of the specification referred to above. The welding is downhand direct current reverse polarity at a current between 100 and 550 amperes depending on the wire diameter and a voltage between 20 and 35 volts. Air is excluded from the weld by carbon dioxide gas free from moisture flowing at a rate of 40 cubic feet per hour. Alternately the shielding gas may be argon or helium or other suitable gases or mixtures, free from moisture, flowing at 40 cubic feet per hour, or the welding arc may be protected from the air by a blanket of flux as described above. The speed of progression of the welding head is 6 to 24 inches per minute.

In view of my invention and disclosure, variations and modifications to meet individual whim or particular need will doubtless become evident to others skilled in the art to obtain all or part of the benefits of my invention without copying the process and composition shown, and I, therefore, claim all such insofar as they fall within the reasonable spirit and scope of my claims.

Having thus described my invention what I claim as new and desire to secure by Letters Patent is:

1. A process of producing tough welds of steel at an as-welded yield strength in excess of 115,000 p.s.i., which comprises providing a flux-core having the following composition by weight:

| | |
|---|---|
| A source of fluoride | 5–25%. |
| Magnesia | 5–15%. |
| An arc stabilizer of the class consisting of zircon and titania | 5–45%. |
| Silica | [0] Up to 25%. |
| A source of silicon | 5–10%. |
| A source of manganese | 2–15%. |
| Ferrochrome | [0] Up to 5%. |
| Ferromolybdenum | [0] Up to 5%. |
| Nickel | [0] Up to 20%. |
| Magnesium-aluminum | [0] Up to 15%. | providing an electrode having the following composition by weight:

| | |
|---|---|
| Carbon | 0.05–0.20%. |
| Sulphur | 0.01% maximum. |
| Phosphorus | 0.01% maximum. |
| Silicon | 0.3% maximum. |
| Manganese | 0.05–1.5%. |
| Nickel | [0] Up to 5%. |
| Chromium | [0] Up to 2%. |
| Molybdenum | [0] Up to 1%. |
| Vanadium | [0] Up to 0.1%. |
| Columbium | [0] Up to 0.5%. |
| Copper | [0] Up to 0.5%. |
| Iron | Balance. | pre-heating steel work of a yield strength level in excess of 115,000 p.s.i. to a pre-heating temperature of 100 to 400° F., protecting the flux and electrode against moisture, and electric arcing between said electrode having said flux-core and said work under a separately supplied gaseous atmosphere which protects against air to deposit weld metal and weld said work beneath a slag formed by fusing said flux, said weld metal containing between 1.5 and 5% of nickel.

2. A process of claim 1, which comprises baking said flux at a temperature of between 200 and 1000° F. prior to welding and protecting said flux and electrode against moisture from the time of baking until the time of welding.

3. A process of claim 1, which further comprises additionally baking said flux immediately prior to welding at a temperature of 150 to 300° F. and thereby further protecting against hydrogen.

4. A process of claim 1, which comprises post-heating said work and said weld material immediately after welding at a temperature of 150 to 600° F. for a time of at least one hour.

5. A process of claim 1, in which the nickel content of the weld metal is between 2.0 and 3.5%.

6. A process of claim 1, in which said weld metal has a Charpy V-notch impact resistance in excess of 20 foot-pounds at −60° F. and 30 foot-pounds at room temperature.

7. A process of producing tough welds of steel having a yield strength as welded in excess of 130,000 p.s.i. and having a Charpy V-notch impact resistance in excess of 20 foot-pounds at −60° F., which comprises providing a flux-core having the following composition by weight:

| | |
|---|---|
| A source of fluoride | 5–25%. |
| Magnesia | 5–15%. |
| An arc stabilizer of the class consisting of zircon and titania | 5–45%. |
| Silica | [0] Up to 25%. |
| A source of silicon | 5–10%. |
| A source of manganese | 2–15%. | providing an electrode having the following composition by weight:

| | |
|---|---|
| Carbon | 0.05–0.20%. |
| Sulphur | 0.01% maximum. |
| Phosphorus | 0.01% maximum. |
| Silicon | 0.1% maximum. |
| Manganese | 0.05–1.5%. |
| Nickel | [0] Up to 5%. |
| Chromium | [0] Up to 2%. |
| Molybdenum | [0] Up to 1%. |
| Vanadium | [0] Up to 0.1%. |
| Columbium | [0] Up to 0.5%. |
| Copper | 0.5% maximum. |
| Oxygen | 100 p.p.m. maximum. |
| Hydrogen | 100 p.p.m. maximum. |
| Nitrogen | 100 p.p.m. maximum. |
| Iron | Balance. | pre-heating steel work having the following composition by weight:

| | |
|---|---|
| Carbon | 0.05–0.50%. |
| Sulpuhr | 0.01% maximum. |
| Phosphorus | 0.01% maximum. |
| Silicon | 0.5% maximum. |
| Manganese | 0.05–1.5%. |
| Nickel | 0.5–5%. |
| Chromium | [0] Up to 2%. |
| Molybdenum | [0] Up to 1%. |
| Vanadium | [0] Up to 0.1%. |
| Columbium | [0] Up to 0.5%. |
| Copper | [0] Up to 0.5%. |
| Iron | Balance. | to a temperature of between 100 and 400° F., baking the flux at a temperature of between 200 and 1000° F. and maintaining the flux and the electrode free from moisture subsequent to baking and prior to welding, electric arcing between said pre-heated work and said electrode having said flux-core to deposit weld metal having the following composition by weight:

| | |
|---|---|
| Carbon | 0.05–0.15%. |
| Sulphur | 0.01% maximum. |
| Phosphorus | 0.01% maximum. |
| Silicon | 0.6% maximum |
| Manganese | 1.0–2.3%. |
| Nickel | 1.5–5%. |
| Chromium | 0.5–1.5%. |
| Molybdenum | 0.3–0.6%. |
| Vanadium | [0] Up to 0.1%. |
| Columbium | [0] Up to 0.5%. |
| Copper | [0] Up to 0.5%. |
| Oxygen | 400 p.p.m. maximum. |
| Hydrogen | 50 p.p.m. maximum. |
| Nitrogen | 300 p.p.m. maximum. |
| Iron | Balance. | and post-heating said work and said weld metal at a temperature of between 150 and 600° F. to permit the hydrogen to diffuse out of the weld area until the hydrogen content is less than 10 p.p.m.

8. A process of claim 7, which comprises depositing weld metal having a nickel content between 2.0 and 3.5%.

9. A process of claim 8, which comprises further baking the flux and the electrode immediately prior to welding it at a temperature between 150 and 300° F.

10. A flux and metallic electrode for joint use in the consumable electrode electric arc welding of steel comprising a flux-core having the following composition by weight:

| | |
|---|---|
| A source of fluoride | 5–25%. |
| Magnesia | 5–15%. |
| An arc stabilizer of a class consisting of zircon and titania | 5–45%. |
| Silica | [0] Up to 25%. |
| A source of silicon | 5–10%. |
| A source of manganese | 2–15%. |
| Ferrochrome | [0] Up to 5%. |
| Ferromolybdenum | [0] Up to 3%. |
| Nickel | [0] Up to 20%. |
| Manganese-aluminum | [0] Up to 15%. | and a metallic sheath electrode having the following composition by weight:

| | |
|---|---|
| Carbon | 0.05–0.20%. |
| Sulphur | 0.01% maximum. |
| Phosphorus | 0.01% maximum. |
| Silicon | 0.3% maximum. |
| Manganese | 0.05–1.5%. |
| Nickel | [0] Up to 5%. |
| Chromium | [0] Up to 2%. |
| Molybdenum | [0] Up to 1%. |
| Vanadium | [0] Up to 0.1%. |
| Columbium | [0] Up to 0.5%. |
| Copper | [0] Up to 0.5%. |
| Oxygen | 100 p.p.m. maximum |
| Hydrogen | 10 p.p.m. maximum. |
| Nitrogen | 100 p.p.m. maximum |
| Iron | Balance. |

11. Metallic electrode, and flux-core, for use in combination in consumable electric arc welding processes, consisting of electrode having the following composition by weight disregarding gaseous inclusions:

| | |
|---|---|
| Carbon | 0.05–0.20%. |
| Sulphur | 0.01% maximum. |
| Phosphorus | 0.01% maximum. |
| Silicon | 0.3% maximum. |
| Manganese | 0.05–1.5%. |
| Nickel | [0] Up to 5%. |
| Chromium | [0] Up to 2%. |
| Molybdenum | [0] Up to 1%. |
| Vanadium | [0] Up to 0.1%. |
| Columbium | [0] Up to 0.5%. |
| Copper | [0] Up to 0.5%. |
| Iron | Balance. | and a flux-core having the following composition by weight:

| | |
|---|---|
| A source of fluoride | 5–25%. |
| Magnesia | 5–15%. |
| An arc stabilizer of the class consisting of zircon and titania | 5–45%. |
| Silica | [0] Up to 25%. |
| A source of silicon | 5–10%. |
| A source of manganese | 2–15%. |
| Ferrochrome | [0] Up to 5%. |
| Ferromolybdenum | [0] Up to 20%. |
| Nickel | [0] Up to 20%. |
| Magnesium-aluminum | [0] Up to 15%. |

References Cited

UNITED STATES PATENTS

| | | | |
|---|---|---|---|
| 2,825,793 | 3/1958 | Kee | 219—146 |
| 3,023,130 | 2/1962 | Wasserman et al. | 219—146 X |
| 3,221,136 | 11/1965 | Freeth et al. | 219—146 |

RICHARD M. WOOD, *Primary Examiner.*

J. G. SMITH, *Assistant Examiner.*

U.S. Cl. X.R.

117—202; 219—146

UNITED STATES PATENT OFFICE
CERTIFICATE OF CORRECTION

Patent No. 3,424,892 January 28, 1969

Wayne L. Wilcox

It is certified that error appears in the above identified patent and that said Letters Patent are hereby corrected as shown below:

Column 6, line 50, "pefrerred" should read -- preferred --. Column 7, line 38, "Suhphur" should read -- Sulphur --; line 75, cancel "in welding HP-150 steel are at least as good as the fol-". Column 8, line 48, "Llyod's" should read -- Lloyd's --. Column 9, line 9, cancel "5-45%" and insert the same in line 10, opposite "titania ------"; line 55, "atemperature" should read -- a temperature --. Column 10, line 16, "100" should read -- 10 --.

Signed and sealed this 24th day of March 1970.

(SEAL)
Attest:

Edward M. Fletcher, Jr.
Attesting Officer

WILLIAM E. SCHUYLER, JR.
Commissioner of Patents